United States Patent [19]
Platzoder

[11] 3,758,832
[45] Sept. 11, 1973

[54] THYRISTOR WITH SHORT CIRCUITING RING

[75] Inventor: Karl Platzoder, Munchen, Germany

[73] Assignee: Siemens Aktiengesellschaft, Munich & Berlin, Germany

[22] Filed: Feb. 17, 1972

[21] Appl. No.: 227,159

[30] Foreign Application Priority Data

Feb. 19, 1971 Germany .................. P 21 08 111.8

[52] U.S. Cl. ........................ 317/235 R, 317/235 AB
[51] Int. Cl. ........................ H01l 5/00
[58] Field of Search ........................ 317/235, 41.1

[56] References Cited

UNITED STATES PATENTS 3,409,811 11/1968 Gerlach .............................. 317/235

*Primary Examiner*—John W. Huckert
*Assistant Examiner*—E. Wojciechowicz
*Attorney*—Arthur E. Wilfond et al.

[57] ABSTRACT

The known short-circuiting ring is situated entirely under the emitter electrode. As the electrode cannot be brought up to the edge of the semiconductor body because of the disturbances caused by finishing operations in the edge region, such as beveling, etching, etc., effective emitter area is lost. According to the invention, the short-circuiting ring is placed into the edge region and is connected to the electrode by parts of the base zone extending through cutouts in the emitter zone.

5 Claims, 4 Drawing Figures

THYRISTOR WITH SHORT CIRCUITING RING

The present invention relates to a semiconductor component with a disc shaped semiconductor body having at least four zones of alternating conduction type and at least three pn junctions, in which an area of the second zone constitutes a short-circuiting ring, surrounds the first zone and with a conducting coating which, electrically connects the first zone with the short-circuiting ring.

Such a component is described, for instance, in German published Pat. No. 1,133,038. A thyristor is described in this patent in which the emitter zone is surrounded by a base zone. The surfaces of the emitter zone and of the base zone are connected with each other by a conductive coating. The part of the base, surrounding the emitter zone, can be called a "short-circuiting ring." At small current densities, this is at small voltage drop under the emitter zone, a portion of the charge carriers flows through this short-circuiting ring not into the emitter zone, but by-passes the latter and flows through the short-circuiting ring to the conducting coating and from there, via the emitter electrode, to the emitter lead. The portion of the charge carriers which is drained off via the conducting coating, therefore, causes no injection of charge carriers from the emitter zone into the adjacent base zone. This emitter efficiency is thereby reduced, so that the thyristor can be fired only at higher currents. The temperature stability of the cutoff characteristic, for instance, is increased thereby. A short-circuiting ring also has a favorable effect on the dU/dt behavior of the thyristor. This can be explained by the fact that, for a very rapid voltage rise at the thyristor, a large displacement current ensues, which acts like a control current, due to the capacity of the cutoff pn junctions. Thereby, many charge carriers would be injected from the emitter into the adjacent base layer, unless a certain portion of the charge carriers constituting the displacement current would flow to the conductive coating, by-passing the emitter zone.

Good utilization of the cross section of the semiconductor body would be obtained if the conducting coating (electrode) extends to the edge zone of the semiconductor body. This, however, is not directly possible as the edge zone of the semiconductor body is bevelled and/or etched and the conducting coating (electrode) would thereby be attacked. The conducting coating can, therefore, only be brought to the edge zone. As the emitter zone occupies a smaller area than the electrode, the area is not optimally utilized in the known semiconductor components with short-circuiting ring.

The object of the present invention is to further develop a semiconductor component of the type mentioned above, in such a manner that the effective emitter area can be enlarged up to the edge zone.

The invention is characterized in that the short-circuiting ring is situated in the edge zone, the first zone extends to the edge of the conductive coating and the first zone has recesses open toward the short-circuiting ring through which the second zone penetrates and extends up to the conducting coating.

The invention will be further explained with reference to the Drawing, showing in embodiment examples where:

FIG. 1 schematically shows a cross section through a semiconductor body of a known semiconductor component with short-circuiting ring;

Figure 1:
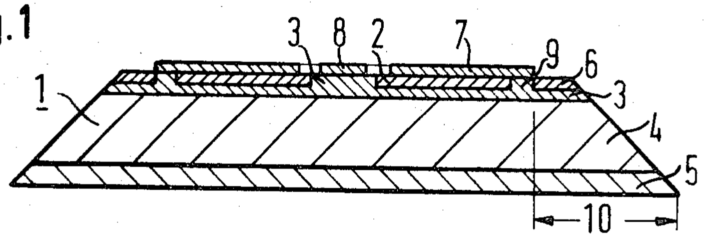
Fig.1 PRIOR ART
Figure 2:
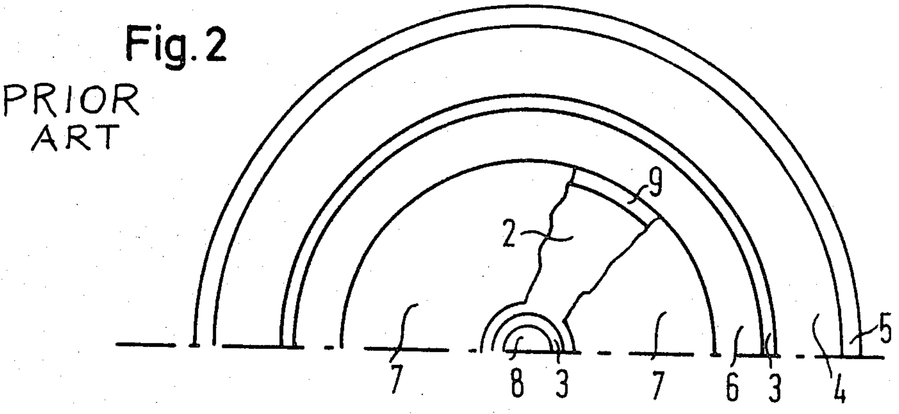
Fig. 2 PRIOR ART
FIG. 2 shows a partial plan view of a semiconductor according to FIG. 1.

The semiconductor body of FIG. 1 is designated in its entirety by the reference numeral 1. The body consists of four zones, namely, the emitter zone 2, the base zone 3, and the base zone 4, and the emitter zone 5. The emitter zone 2 is surrounded by a short-circuiting ring 9, which forms part of the base zone 3. The short-circuiting ring 9, in turn is surrounded by a partial zone 6 which has the same doping as the emitter zone 2. The emitter zone 2 and the short-circuiting ring 9 are covered by a conducting coating 7, which forms the electrode. This conducting coating does not cover the partial zone, as that zone and the edge zones 3,4 and 5 belong to the outer zone of the semiconductor body which is designated 10. The outer zone 10 cannot be utilized, as mentioned above, for the electrode. The electrode 7 can, therefore, be extended only to near the edge zone 10.

Figure 3:
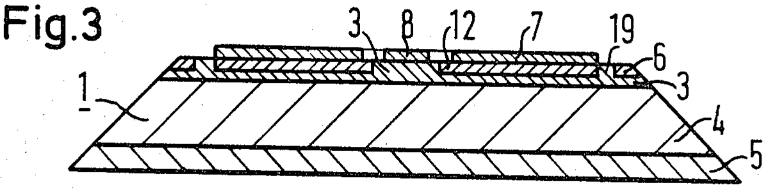
FIG. 3 shows, schematically, a cross section through a semiconductor body of a semiconductor component according to the invention.
Figure 4:
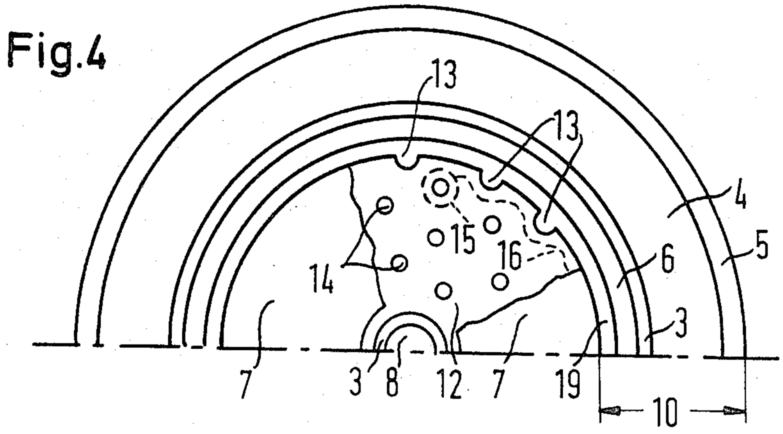
FIG. 4 shows a partial plane view of the semiconductor body according to FIG. 3.

FIG. 3 shows the cross section through a semiconductor component according to the invention. Here, parts similar to those in FIG. 1 are given the same reference symbols. The base zone 3 shows a short-circuiting ring 19, which as compared to the short-circuiting ring 9 according to FIG. 1, is shifted further to the edge of the semiconductor body and is situated in the edge zone 10. The emitter zone 12 is brought up to under the edge of the conducting coating 7. FIG. 4 shows how the short-circuiting ring 19 is connected with the conducting coating 7.

FIG. 4 shows a plan view on the semiconductor body according to FIG. 3. The conducting coating 7 is here partiall removed for the sake of clarification, so that a large part of the emitter zone 12 is visible. The edge of the emitter zone 12 shows a number of cutouts 13 through which zone 3 penetrates up to the conducting coating 7. It could also be stated that short-circuiting ring 19 has projections which extend under the conducting coating 7. Through the cutouts 13 and the projections, respectively, the short-circuiting ring 19 is electrically connected with the conducting coating 7. A part of the charge carriers coming from the base zone 3 therefore moves, provided the voltage drop under the emitter zone 12 is small enough, in the direction toward the short-circuiting ring 19 and arrives via one of the coutouts at the conducting coating 7, that is at the emitter electrode, from where the charge carrier can flow off. Here the charge carrier, must possibly travel in the short-circuiting ring a distance in the tangential direction to the nearest cutout. The short-circuiting ring therefore represents a certain resistance. For the doping profiles commonly used for power semiconductors, the resistance between two cutouts spaced 2 mm apart, is about 20 to 80 Ω. But even with very high dU/dt stresses (1,000 V/μs) only voltage drops of approximately 0.1 to 0.4 V occur within the short-circuiting ring, as on one hand, the influence range of the short-circuiting ring is limited to a part of the thyristor area because of the relatively low transverse conductivity under the n emtter and, on the other hand, because of the capacitive current flowing in this partial area is distributed over several cutouts of the short-circuiting ring. Only for voltage drops of more than 0.7 V would the short-circuit lose its effectiveness.

The novel short-circuiting ring, therefore, fulfills its purpose at low current densities such as they occur for dU/dt stresses for instance, just as well as the conventional short-circuiting ring. Above all, firing at the edge zone of the thyristor is prevented which, as is well known, represents a weak point in every semiconductor component.

For higher firing currents, that is for the intended firing via the base electrode 8, the current density under the end emitter 12 becomes larger. Thus, the voltage drop under this zone increases so much that the charge carriers flow from the base zone 3 to the emitter zone 12 and there cause an injection of charge carriers of opposite polarity into the base zone 3. In this case, the short-circuiting ring is ineffective, i.e., the full n emitter area is available for the load current. This applies equally to the steady-state situation in which the thyristor carries the full current.

In semiconductor bodies with large diameter there can be provided, in addition to the cutouts 13 in the base zone 12, further cutouts 14, which can further improve the dU/dt behavior of the thyristor. The arrangement of such further cutouts, however, has already been known for some time. It is pointed out that a distribution of the further cutouts 14 in the vicinity of the edge at the circumference of the base zone 12 does not have the same effect as the cutouts 13 which are open toward the short-circuiting ring 19. As indicated in FIG. 4, by the reference numerals 15 and 16, further cutouts 14 and the cutouts 13 open toward the short-circuiting ring 19 have differently shaped "influence areas" within which a charge carrier in zone 3 can still flow to the conductive coating 7. The size of the influence areas depends here on the resistance which the charge carrier encounters in its path. With increasing current density this influence area becomes smaller. It can be seen that the influence area 16 of the cutouts 13 is in any event larger than the influence area 15 of the further cutouts 14. Mainly, a complete coverage of the influence areas occurs.

The present invention is particularly useful for thyristors, the zones of which are prepared by diffusion. A silicon disc of, for instance, 30 mm diameter and a thickness of, for instance, 300 $\mu$ and a base doping of approximately $10^{14}cm^{-3}$ is subjected to Al/Ga or Al/B diffusion for about 36 hours. The outer zones of the semiconductor body thus have a doping of more than $10^{18}cm^{-3}$. A layer of $SiO_2$ approximately 1 $\mu$ thick, which is coated with a photosensitive resist is then generated. On the surface of the semiconductor body this resist is then exposed through a mask. Subsequently, the resist is dissolved at the unexposed places and the $SiO_2$ is etched away at these points. Then, phosphorus glass is formed on the surface, whereupon the semiconductor body is subjected to a temperature of above 1,200° C for approximately seven hours. The n-zone then has a thickness of approximately 15 $\mu$ and is doped to approximately $10^{20}cm^{-3}$. From 30 to 50 semiconductor cutouts with a radius of about 0.1 to 0.5mm, have been found useful. These cutouts are distributed approximately uniformly over the circumference of the n-zone. The short-circuiting ring can be approximately 0.5 to 2 mm wide, the edge zone about 2 to 5 mm. Finally, the emitter zone 12 is provided with a conducting layer 7, for instance, of evaporated aluminum 5 to 50 $\mu$ thick.

What is claimed is:

1. A semiconductor component comprising a conductor body having at least four zones of alternating conduction type and at least three pn junctions, a first zone on the surface of the component and a second zone, part of said second zone extending through said first zone to the surface of the component so as to form a short-circuiting ring, said short-circuiting ring surrounding part of said first zone, a conducting cover coating on said first zone, a plurality of open recesses formed in the outer edge portion of said part of first zone and opening in a direction facing said short-circuiting ring of said second zone, said second zone having portions penetrating into said recesses and extending to said conducting cover to provide an electrical connection between said conducting cover and said second zone.

2. The semiconductor component of claim 1, wherein the recesses are distributed uniformly over the circumference of said part of said first zone.

3. The semiconductor component of claim 2, wherein the first zone has further cutouts through which the second zone extends to the conducting coating.

4. The semiconductor component of claim 3, wherein the zones of the semiconductor body are prepared by diffusion.

5. The semiconductor component of claim 2, wherein the recesses are made by a photoresist technique.

* * * * *